United States Patent
Sabin

(10) Patent No.: US 7,305,937 B2
(45) Date of Patent: Dec. 11, 2007

(54) ROTARY TOROIDAL MACHINE WITH PISTON CONNECTING MECHANISM

(76) Inventor: Darrel B. Sabin, 4128 Graceway Dr., Toledo, OH (US) 43606

( * ) Notice: Subject to any disclaimer, the term of this patent is extended or adjusted under 35 U.S.C. 154(b) by 161 days.

(21) Appl. No.: 11/260,953

(22) Filed: Oct. 28, 2005

(65) Prior Publication Data

US 2007/0095307 A1    May 3, 2007

(51) Int. Cl.
*F01C 9/00* (2006.01)

(52) U.S. Cl. .................................. 123/18 A; 123/18 R

(58) Field of Classification Search .................... None
See application file for complete search history.

(56) References Cited

U.S. PATENT DOCUMENTS

| | | | |
|---|---|---|---|
| 1,003,800 A | 9/1911 | Rodigin | |
| 1,250,859 A | 12/1917 | Grimmett et al. | |
| 1,352,197 A | 9/1920 | Henderson | |
| 1,695,888 A | 12/1928 | Dowdey | |
| 1,729,242 A | 9/1929 | Bregere | |
| 3,080,856 A | 3/1963 | Berry | |
| 3,087,671 A * | 4/1963 | Myles | 418/34 |
| 3,580,856 A | 5/1971 | Zubler | |
| 3,602,203 A * | 8/1971 | Mowry | 123/18 A |
| 3,644,069 A | 2/1972 | Stewart | 418/33 |
| 3,739,754 A * | 6/1973 | Nutku | 123/229 |
| 3,937,187 A * | 2/1976 | Bergen | 418/36 |
| 4,026,249 A * | 5/1977 | Larrea | 123/245 |
| 4,084,550 A * | 4/1978 | Gaspar | 123/245 |
| 4,319,551 A * | 3/1982 | Rubinshtein | 123/245 |
| 5,192,201 A * | 3/1993 | Beben | 418/38 |
| 5,970,924 A | 10/1999 | Pyon | 128/18 |
| 6,021,746 A | 2/2000 | Pyon | |
| 6,341,590 B1 * | 1/2002 | Barrera et al. | 123/245 |
| 6,880,494 B2 * | 4/2005 | Hoose | 123/18 A |
| 7,182,061 B2 * | 2/2007 | Georgescu | 123/245 |
| 2006/0150949 A1 * | 7/2006 | Kovalenko | 123/241 |

* cited by examiner

*Primary Examiner*—Thomas Denion
*Assistant Examiner*—Douglas J. Duff
(74) *Attorney, Agent, or Firm*—Gifford, Krass, Sprinkle, Anderson & Citkowski, P.C.

(57) ABSTRACT

A rotary machine includes a housing divided into a first stationary portion and a second rotational portion. The second rotational portion is supported for rotation with respect to the stationary portion about an axis of the housing. The first and second portions of the housing cooperate to define a generally toroidal passage which is coaxial with the housing axis. A first piston and a second piston are disposed in the passage. Each piston has an interconnection mechanism for selectively interconnecting the piston to either the stationary portion or the rotational portion.

13 Claims, 5 Drawing Sheets

ROTARY TOROIDAL MACHINE WITH PISTON CONNECTING MECHANISM

FIELD OF THE INVENTION

This invention is for a machine such as an internal combustion engine or a compressor that utilizes a special torus-shaped housing. The operation of the machine is made possible by using half of the torus as a rotor and by employing unique, specially designed pistons to drive the rotor. The overall design makes it possible to eliminate the intake and exhaust valves, crankshafts, overhead cams, and timing chains found in conventional internal combustion engines and compressors.

BACKGROUND OF THE INVENTION

Conventional devices utilizing pistons and crankshafts, such as internal combustion engines and compressors present challenges to the designer. The reciprocating motion of the pistons makes it difficult, if not impossible, to achieve a perfectly balanced engine. Valves require maintenance. Air-cooling of an engine is preferable to water-cooling.

SUMMARY OF THE INVENTION

The present invention provides several embodiments of a rotary machine, and a method for compressing and expanding a gas. One embodiment of a rotary machine includes a housing divided into a first stationary portion and a second rotational portion. The second rotational portion is supported for rotation with respect to the stationary portion about an axis of the housing. The first and second portions of the housing cooperate to define a generally toroidal passage which is coaxial with the housing axis. A first piston and a second piston are disposed in the passage. Each piston has an interconnection mechanism for selectively interconnecting the piston to either the stationary portion or the rotational portion of the housing.

Since it will be understood that the devices that will be described herein may be utilized for similar machines, such as engines and compressors, the description that follows will be for internal combustion engines only, with the understanding that it applies to similar devices as well.

Since design features such as mounting means, inlet and exhaust ductwork, bearings, shafts, and seals vary widely, depending on the intended application of the device, the drawings shown herein are used only to describe the basic elements of the engine.

Further, because of the complexity of the design, sectional drawings may not show every component that actually makes up the section. In such cases, the description of the drawing will indicate which components of the total are being illustrated.

Other objects, features, and advantages of the present invention will be readily apparent when the following description is taken in conjunction with the accompanying drawings.

DETAILED DESCRIPTION OF THE INVENTION

General Description of the Torus

Figure 1:
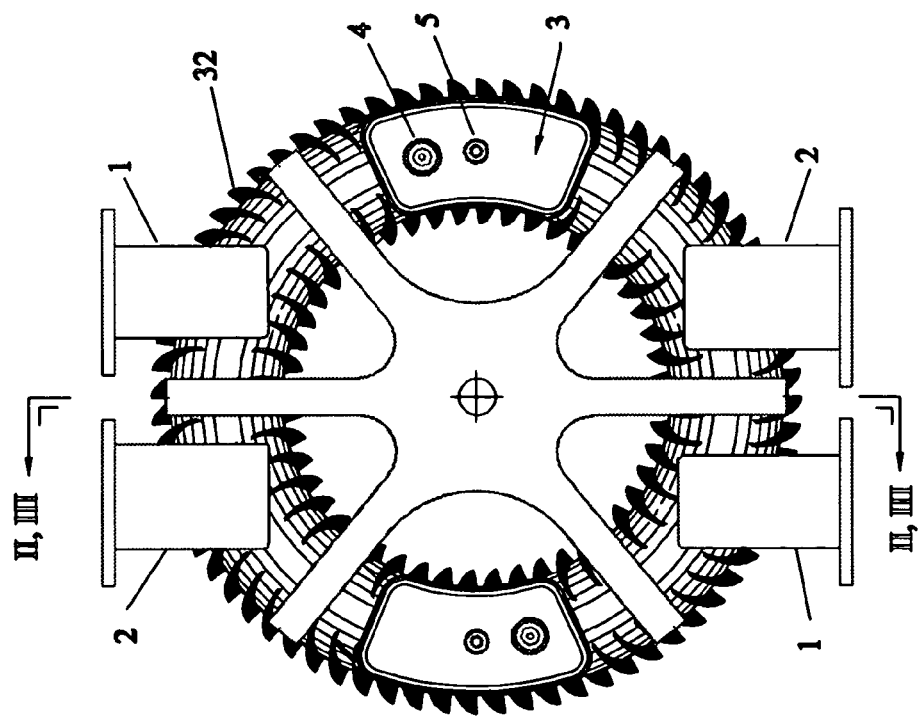
FIG. 1 is an elevational view of one embodiment of an engine of the present invention having toroidal separation that is at right angles to the engine shaft.

Referring to the drawings wherein like reference numerals are used throughout the various drawings to designate corresponding parts, and more particularly to FIG. 1: The elevation view of the toroidal engine shows the preferred design in which there are two air or air/gas inlet ducts a1 and two exhaust ducts a2 as well as two combustion chambers a3. Some engine components, such as cooling air directional ducts and engine mounting means, are not shown.

Figure 2:
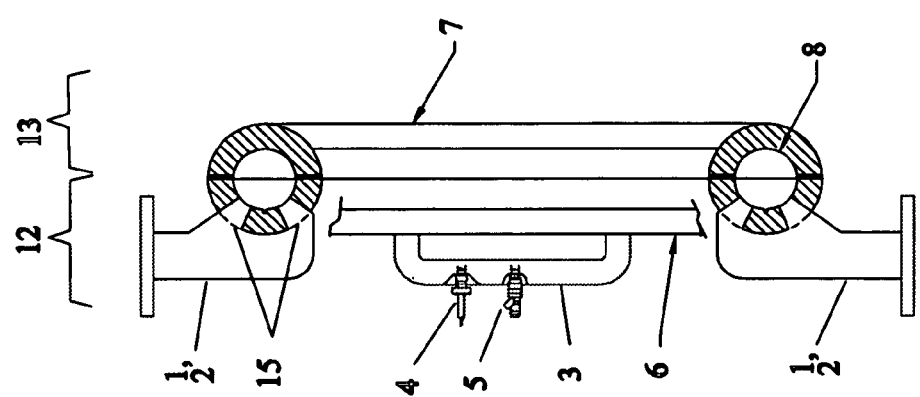
FIG. 2 is a sectional drawing of the engine showing the body of the engine.

Referring to cross-sectional view FIG. 2: It will be noted that the torus consists of two halves, divided at right-angles to the engine shaft. As shown, the left half 12 is the stationary half and the right half 13 rotates. The tube of the torus 8 contains the pistons. The ports 15 shown in the torus could be for combustion air inlet a1 or for exhaust gas outlet 2. The reason for splitting the ports 15 will be explained later.

The walls of the torus are shown as 6 and 7. The housing of one combustion chamber 3 is shown, together with a spark plug 4 and the optional fuel injector 5.

Figure 3:
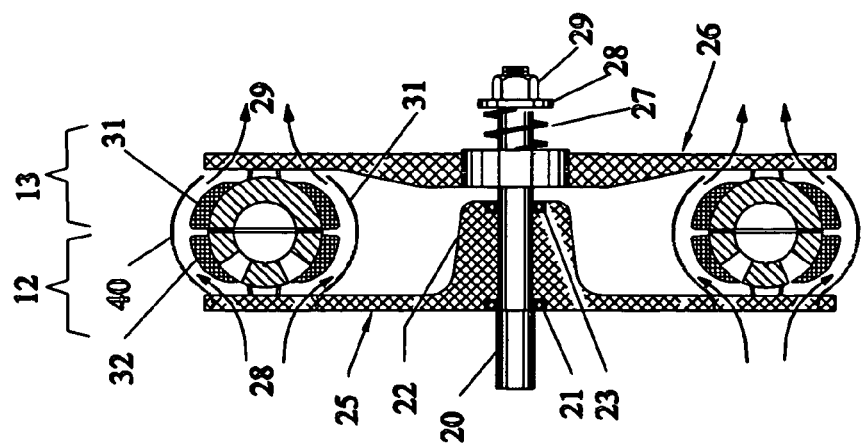
FIG. 3 is also a section of the engine showing other components that make up the engine.

FIG. 3 shows the rotating half of the torus 13 positioned relative to the stationary half of the torus 12 by the rotating shaft 20. Two bearings 21 and 23 are embedded in the housing 22 which is part of the end bell 25. The rotating half of the torus 13 is supported by the end bell 26 and loosely keyed to the shaft 20. The spring 27, backed by the washer 28 and the adjusting nut 29, causes the rotor 13 to press against the stator 12 at some controlled pressure. The edges of the rotor 13 that ride against the edges of the stator 12, in the preferred design, are lined with an anti-friction, lubricated metal, as will be described later.

Although a coil spring 27 is used to illustrate one means of applying pressure between the rotor 13 and the stator 12, it will be obvious that other means may be employed to accomplish the same function. Another spring-type device that might be used is a Belleville washer. A means of providing adjustable pressure while the engine is running would be the utilization of a pneumatic or hydraulic cylinder.

Design and Operation of the Pistons

The essence of the operation of the toroidal engine described herein is the provision of a means to enable any particular piston to convert from a dynamic state to a static state, and vice versa, almost instantly.

Consider the case of two spheres of equal size and weight. One sphere is stopped and the other sphere is moving. The resting sphere is directly in the path of the moving sphere. When the moving sphere strikes the static sphere the sphere that had been stopped almost instantly moves at the velocity of the sphere that struck it. The sphere that struck the standing sphere stops, almost instantly. Thus, it can be said that one sphere changes from a static state to a dynamic state and the other sphere changes from a dynamic state to a static state.

The pistons used in the torus engine described herein are required to start and stop almost instantly, for reasons that will be described later. A complication in the design of the pistons is the fact that the moving pistons must be connected to the rotating half of the torus in order to drive the rotor and the static pistons must be connected to the static portion of the torus for reasons that will be explained later.

Figure 4:
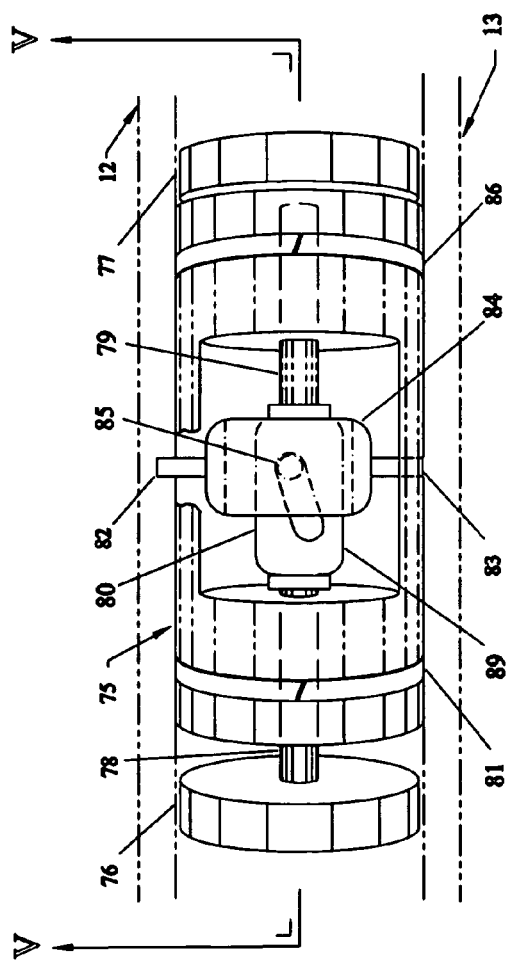

Referring now to FIG. 4 which is a top view of a piston: As shown in the drawing, the piston is moving to the right. The stator half of the torus 12 is shown in phantom view above the piston, and the rotor portion of the torus 13 is shown in phantom view below the piston. The body of the piston 75 is curved to fit the shape of the torus. There is a left plunger plate 76 and a right plunger plate 77. The two plunger plates 76 and 77 are connected by means of the curved rods 78 and 79 and by the slider plate 80. At the center of the piston are the pins 82 and 83 that lock the piston to the torus stator 12 or rotor 13. Two piston rings 81 and 86 are shown.

Figure 6:
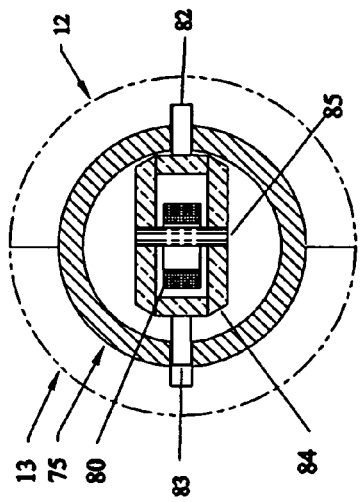
FIGS. 4, 5, and 6 are detailed views of the special pistons that are a preferred part of the engine of FIG. 1.
Figure 5:
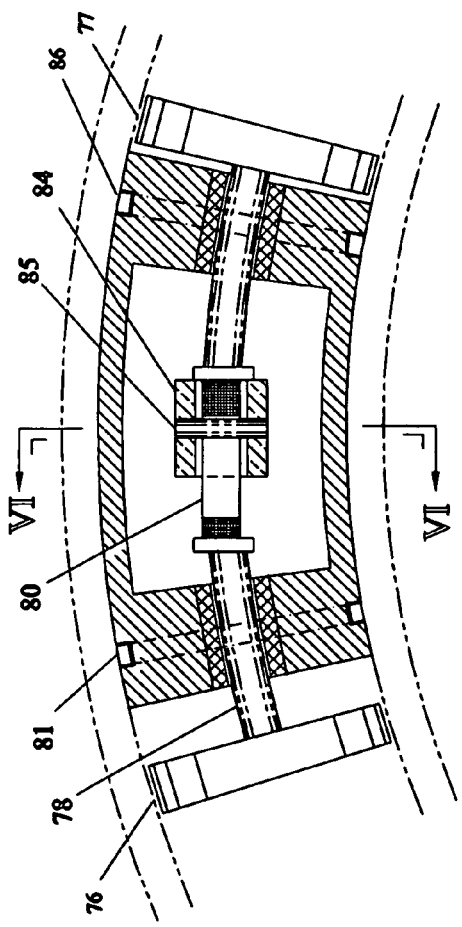

FIG. 5 is a sectional view of the piston showing slider plate 80 and the pin control mechanism 84, without showing the pins 82 or 83 themselves. FIG. 6 is a sectional view of the piston 75 together with the surrounding torus 12 and 13, shown in phantom.

Looking at FIG. 4: If the left-hand plunger plate 76 is pushed and moved to the right while the piston remains stationary, the left-hand plunger rod 78 and the right-hand plunger rod 79 will be moved to the right and plunger plate 77 will be moved away from the main body of the piston 75.

As the rods 78 and 79 move to the right, the movement of the slider plate 80 pushing on the round bar 85 of the pin control mechanism 84 causes the pin control mechanism 84 and the pins 82 and 83 to move down, in the view shown in FIG. 4. The result of this movement is that the pin 83 will be extended downward into a slot in the rotor 13 and the pin 82 will be retracted from a slot in the stator 12. The reverse is true when the plunger rods 78 and 79 are moved to the left.

Thus, the rule is: A piston that is impinged on from behind is caused to unlock from the stator 12 and to lock on to the rotor 13 of the torus; likewise, a piston that impinges on the plunger plate of the piston ahead of it is caused to be unlocked from the rotor 13 and to be locked to the stator 12 of the torus.

The drawings of the piston show a design for a toroidal engine that is divided at right-angles to the engine shaft. It will be obvious that for a toroidal engine that is divided parallel to the engine shaft, the pin control mechanism 84 would be rotated 90 degrees from the position shown.

It should be understood that the ratio of piston length to piston diameter shown in FIG. 4 and the number and location of the piston rings 81 and 86 were selected only for illustration purposes and the particular design shown is not intended to suggest any particular piston length/diameter ratio or piston ring number or location.

As will be clear to those of skill in the art, the interconnection of the pistons with the housing portions may be accomplished in a variety of ways other than the illustrated and described approach.

Piston Plungers

In describing the mechanism for causing the pistons to start and stop, above, the words "impinge" and "impinged" were used in referring to the plunger plates. However, the words "impinge" and "impinged" should not be taken literally.

Note that the plunger plates 76 and 77 are almost the full diameter of the inside of the torus. Further, the faces of the plunger plates 76 and 77 will be machined or ground to a fine finish. The combination of the large diameter and the smooth finish of the plunger plates 77 and 78 has two effects:

1. When a leading plunger plate 77 of one piston meets a trailing plunger plate 78 of another piston there will always be gas or air between the two plates 77 and 78. The velocity of the moving piston toward the static piston is so great that a pressure builds up between the two plunger plates 77 and 78. This compressed air or gas between the plates prevents the actual touching of the two plunger plates 77 and 78.

2. In cases where the velocity of the rotor is very low, such as when the engine is being started, the fine finish of the two plunger plates 77 and 78 will prevent the touching of the two plates; i.e., there will always be a thin layer of gas or air between the surfaces of the two plates. Further, there will be a film of lubricating oil on the plunger plates that will assist in the prevention of metal-to-metal contact of the two plunger plates 76 and 77.

It should be noted that as one plunger plate of one piston—say, a trailing plate 76—is pushed forward by the leading plate 77 of another piston, neither the trailing plate 76 nor the leading plate 77 preferably ever actually touches its respective piston. The reason for this is that the front piston will be connected to the rotor 13 and disconnected from the stator 91 before the trailing plunger plate 76 actually touches the rear piston 76.

In order to illustrate the operation of the piston plunger plates and piston pins, one particular design has been described and illustrated. There can be, however, many designs of such a piston/plunger plate/locking pin mechanism and this patent is not limited to any particular design of the piston control mechanism.

Operation of the Engine

FIG. 7 through FIG. 12 shows the operation of a typical engine. It should be understood that the drawings are intended to illustrate the components that are a part of the engine cycle and that the drawings are not intended to be totally accurate in all facets.

The following description assumes a fuel-injection engine. Reference will be made to combustion air being pulled into the engine. It should be understood that the engine could be carbureted and that a mixture of combustion air and vaporized fuel could be pulled into the engine in place of combustion air only.

For the purpose of the illustration, the torus is assumed to be split parallel to the engine shaft; i.e., the inside ring 13 represents the rotating half of the torus.

The drawings show six pistons, two air inlet ducts 1, two exhaust gas outlets 2 and two combustion chambers 3. Each combustion chamber 3 is equipped with a fuel injector 5 and spark plug 4. The engine could be designed to operate with half the components listed above but with some loss in balance and temperature uniformity.

The rotor 13 is turning clockwise, as shown by the arrows.

Figure 7:
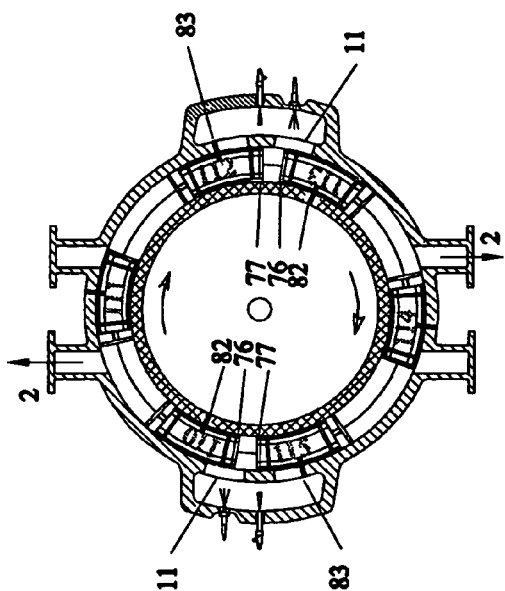
FIGS. 7, 8, 9, 10, 11, and 12 are cut-away views of an embodiment of an engine according to the invention, illustrating the engine cycles.

In FIG. 7, pistons 110, 111, 113, and 114 are pinned to slots in the stator 91, as illustrated by the pins 83. Pistons 112 and 115 are pinned to the rotor 13 as illustrated by the pins 82. It should be noted that the pins 83 and 82 are shown extending through the stator 91 and rotor 13 only for the purposes of illustration.

Fresh air that has been trapped between pistons 115 and 110 and between pistons 112 and 113 is being forced into the combustion chambers 3 via the ports 10 as the pistons 115 and 110 are driven by the rotor 13. The combustion chambers 3 are sized so that the air being forced into the chambers 3 will be compressed to some desired value.

While the trapped air is being forced into the combustion chambers 3 as described above, fresh air is also being pulled into the torus via the air inlets 1 by the movement of the pistons 115 and 112.

Figure 8:
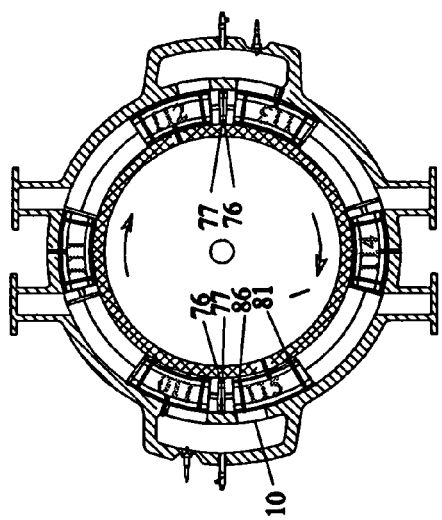

In FIG. 8, the front plunger plates 77 of pistons 115 and 112 have reached the rear plunger plates 76 of pistons 110 and 113, respectively. Compression of the air in the combustion chambers 3 is complete.

Figure 9:
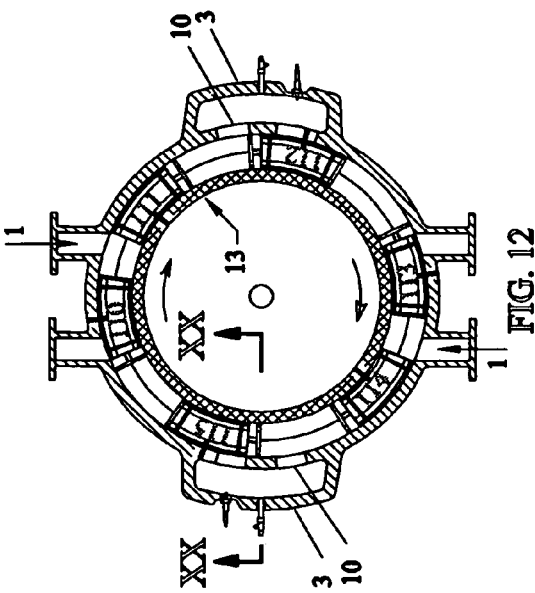

FIG. 9 shows the results when rotating pistons meet static pistons and the former static pistons begin rotating. In all cases, the front plunger plate 77 is pushed back (counter-clockwise) and the rear plunger plate 76 of the forward piston is pushed forward (clockwise). As the front plunger plates 77 of pistons 115 and 112 are moved back by contacting the rear plunger plates 76 of pistons 110 and 113, the locking pins 83 of pistons 112 and 115 are moved to lock those pistons to the stator slots (rather than to the rotor); the locking pins 82 of pistons 110 and 113 are moved to lock those pistons to the rotor (rather than the stator).

As pistons 110 and 113 move with the rotor 13, fuel is injected into the combustion chambers 3 via the injectors 5. The spark plugs 4 begin firing. Hot pressurized combustion gases flow from the combustion chambers 3 to the torus via the passages 11.

Old exhaust gas between pistons 110 and 111 and between piston 113 and 114 are driven out of the torus via the exhaust ports 2 as pistons 110 and 113 rotate. The pressure of the exhaust gases causes piston 111 and piston 114 to move slightly clockwise, to free the exhaust gas ducts 2. The means by which pistons locked to the stator can move some pre-set distance as will be described later.

Figure 10:
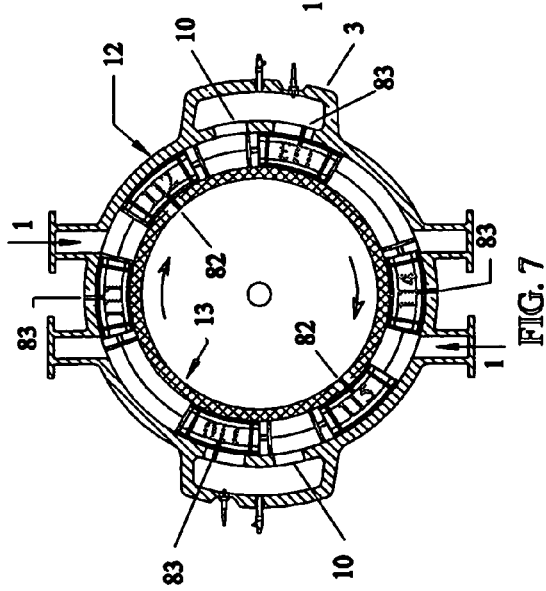

In FIG. 10 pistons 110 and 113 come into contact with pistons 111 and 114. Fuel injection and spark ignition are turned off. All exhaust gases have been discharged.

Figure 11:
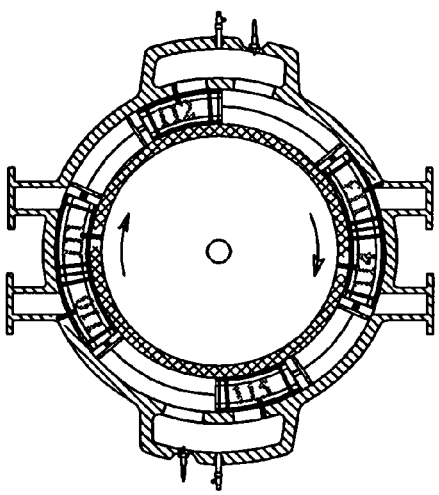

FIG. 11 shows that pistons 110 and 113 are now pinned to slots in the stator 12 while pistons 111 and 114 have become the driving pistons by being pinned to the rotor 13. As the driving pistons 111 and 114 begin moving, carried by the inertia of the rotor, the low pressure between pistons 111 and 110 and between pistons 114 and 113 causes pistons 110 and 113 to move forward. The driving pistons 111 and 114 begin compressing the air between themselves and pistons 112 and 115.

Figure 12:
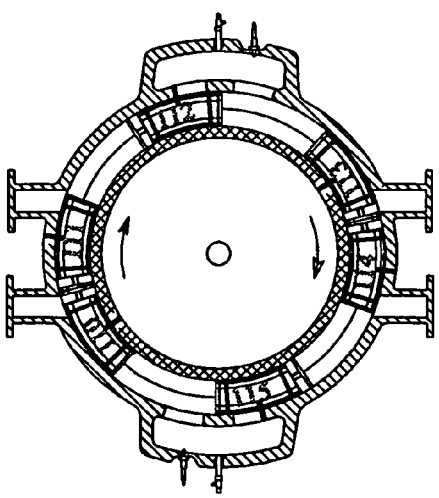

In FIG. 12 the motion of pistons 111 and 114 causes fresh air to be pulled into the torus via the ducts 1. The low pressure between pistons 111 and 110 and between pistons 114 and 113 causes pistons 110 and 113 to begin rotating forward. The pressure of the air between pistons 111 and 112 and between pistons 114 and 115 causes the pistons 112 and 115 to rotate forward and to free the ports 10 leading to the combustion chambers 3. The combustion chambers 3 begin filling with air.

As pistons 111 and 114 continue to move, turned by the inertia of the rotor 82, the results will be seen back in FIG. 7, where the cycle continues.

Engine Cooling

The toroidal shape of the engine lends itself to air cooling. In FIG. 3 angled fins 31 on the rotating half of the engine 13 pull cooling wind over the engine, the wind being directed over the stationary half of the engine 12 by the shroud 40. Fins 32 on the stationary half of the torus 12 help cool that portion of the torus 12 as the cooling wind passes over them. The general paths of the cooling wind are shown by the arrows 28 indicating the inlet paths for cooling air plus the arrows 29 indicating the path of the cooling air exiting the exterior of the torus.

Preferably, the fins 31 and the fins 32 are cast as a part of the torus to increase the conductivity between the torus proper and the fins.

Although fins 31 and 32 are represented in the drawings cited above, the number, design, and location of cooling fins requires a specific design for each specific application.

The combustion chambers 3 may require extra fins or larger fins than the torus proper. Further, it may be desirable to separate the combustion chambers 3 from the torus proper, with only the ducts 10 and 11 connecting the combustion chamber 3 to the torus 12.

It is obvious that the torus may be designed with passages for water cooling in place of air cooling.

Dividing the Torus

The torus may be divided between the static half 12 and the rotary half 13 with the dividing line either parallel to the engine shaft or at right angles to the engine shaft, or some line between.

Figure 13:
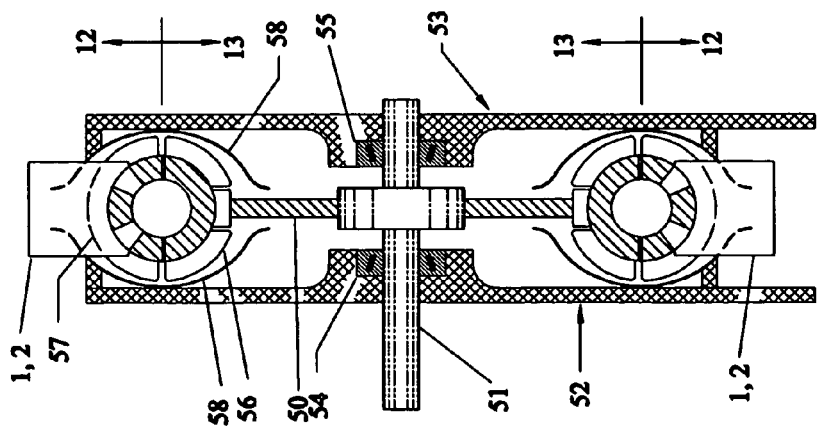
FIG. 13 is a sectional drawing showing a second embodiment of an engine according to the invention, having toroidal separation parallel to the engine shaft.

FIG. 13 shows an engine in which the torus is split parallel to the engine shaft. The inner, rotating half of the torus 13 is connected by the rotor plate 50 to the shaft 51. The outer, stationary half of the torus 12 is supported by the end bells 52 and 53. The shaft 51 rotates within the two bearings 54 and 55. The combustion air inlets 1 and exhaust gas outlets 2 are shown.

Cooling fins 56 on the rotating half of the torus 13 pull cooling air into the space between the two end bells 52 and 53. By centrifugal action, the flow of cooling air is out past the fins 57 on the stationary half of the torus. The cooling wind is directed with the assistance of the ducts 58.

Although FIG. 13 shows the rotating half of the torus inside the stationary half of the torus, the inside of the torus could be the stationary half of the torus.

Toroidal Spacing and Sealing

There are various methods that may be employed to control the interstice between the fixed 12 and the rotary 13 halves of the torus.

Figure 17:
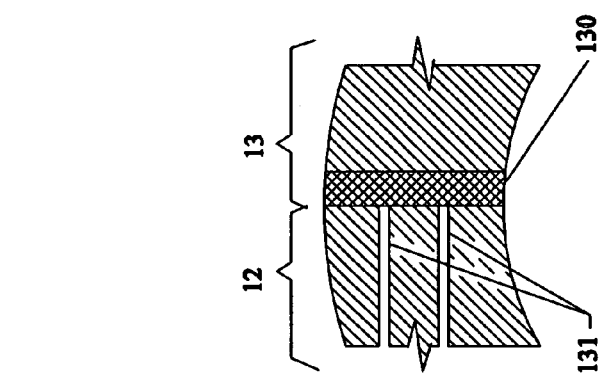
FIG. 17 details one means of separating the torus halves and providing a separate seal.
Figure 14:
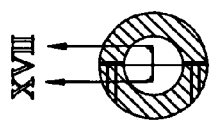
FIG. 14 is a cross-section drawing of one torus shape showing the section detailed in the large-scale FIG. 17.

One preferred method is detailed in FIG. 17. A ring of bearing material 130 such as a bronze alloy is fastened, preferably, to the rotary portion 13 of the torus. A channel or channels 131 are cast or drilled into the stator 12 in order to feed lubricant to the surface of the bearing material 130. The bearing material 130 serves a dual purpose; it provides a low-friction, long-wearing surface to enable the rotary half 13 of the torus to run against the stationary half 12 of the torus and it prevents or minimizes leakage from the inside of the torus to the atmosphere.

Figure 18:
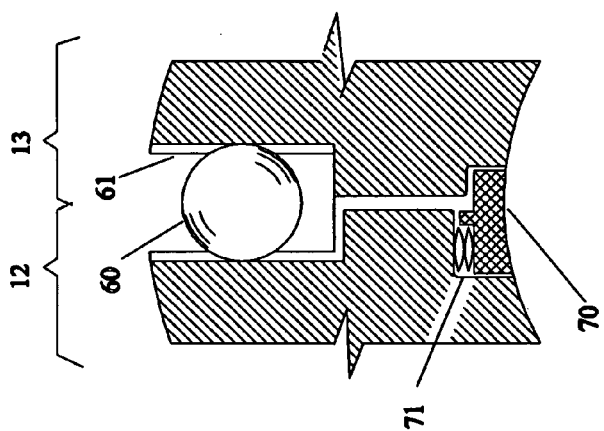
FIG. 18 details another means of separating the torus halves and providing a seal.
Figure 15:
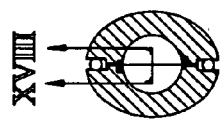
FIG. 15 is a cross-section drawing of a second torus shape showing the section detailed in the large-scale FIG. 18.

Other means may be employed to separate and seal the two halves 12 and 13 of the torus. An enlarged section of one possible arrangement of a torus is illustrated in FIG. 18. A series of bearing balls 60 between the two halves 12 and 13 of the torus is held in position by the retainer 61. This design may require that the exterior of the torus be elliptical in shape, as shown, in order to accommodate the bearing balls 60 plus a seal as described below.

If the two halves 12 and 13 of a torus are held physically separated, as would be the case if bearing balls 60 were used, it would be necessary to seal the space between the two torus halves 12 and 13. Where the two halves 12 and 13 of the torus meet there is a seal, designed to minimize leakage from the torus to the atmosphere and leakage past the pistons. There can be almost any number of designs for such a seal. One design is shown in FIG. 18.

A segmented ring 70 is held in position by the two halves 12 and 13 of the torus. A compression spring 71 pushes the segmented seal ring 70 against the pistons (not shown).

Figure 19:
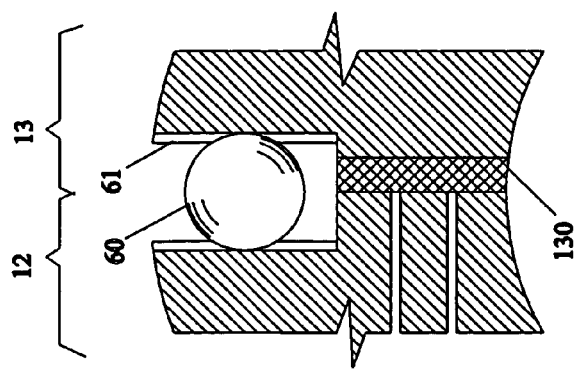
FIG. 19 details yet another means of separating the torus halves and providing a seal.
Figure 16:
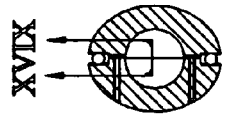
FIG. 16 is a cross-section drawing of a torus showing the section detailed in FIG. 19.

Another means for sealing the two halves 12 and 13 of the torus while holding he halves separated would be to use a combination of the bearing ball spacers 60 and the low friction bearing plate 130, preferably with a torus having an elliptical outside shape. This design is shown in FIG. 19. Many other designs are possible.

Toroidal Alignment

The two halves of a torus divided at right angles to the drive shaft, such as shown in FIGS. 1, 2, and 3, must have effective diameters that are exactly equal, regardless of torus temperatures, in order to insure minimum wear of the pistons, piston rings, and the torus halves themselves.

It may happen that the two halves 12 and 13 will expand and contract uniformly with changes in operating temperature. If so, no further controls would be required. However, in case the two halves 12 and 13 do not maintain dimensional uniformly, means can be designed to determine the dimensional relationship of the two halves 12 and 13 continuously. The measurement of the two halves of the torus 12 and 13 can then be used as the primary element of a controller that would increase or decrease the cooling to one half of the torus.

Similarly, in the case of an engine in which the torus is divided parallel to the engine shaft, as shown in FIG. 13, continuous measurement would be taken of the vertical spacing between the two halves of the torus 12 and 13 and the results of that measurement would again be used to control the cooling of one half of the torus. It is unlikely that a torus such as shown in FIG. 13 would require horizontal position control but such control could be provided by using a measuring system similar to that described above and directing its output to move the rotor 13 horizontally.

Stator and Rotor Slots

It will have been noted that throughout the description of the operation of the toroidal engine a piston that is "pinned" to the stator is capable of moving some fixed distance while "pinned".

Between FIG. 11 and FIG. 12, for example, it can be seen that the pistons 115 and 112 must be free to move clockwise about 30 degrees.

Figure 20:
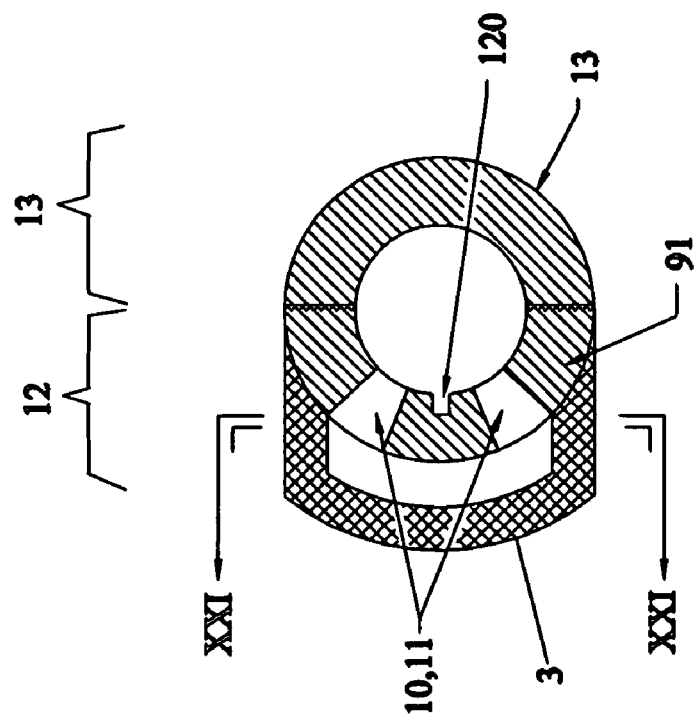
FIG. 20 is a cross-sectional view of a portion of the torus that includes the combustion chamber.

FIG. 20 shows a cross-sectional view of the rotor 13, stator 12, and combustion chamber 3 of a torus divided at right angles to the drive shaft.

Figure 21:
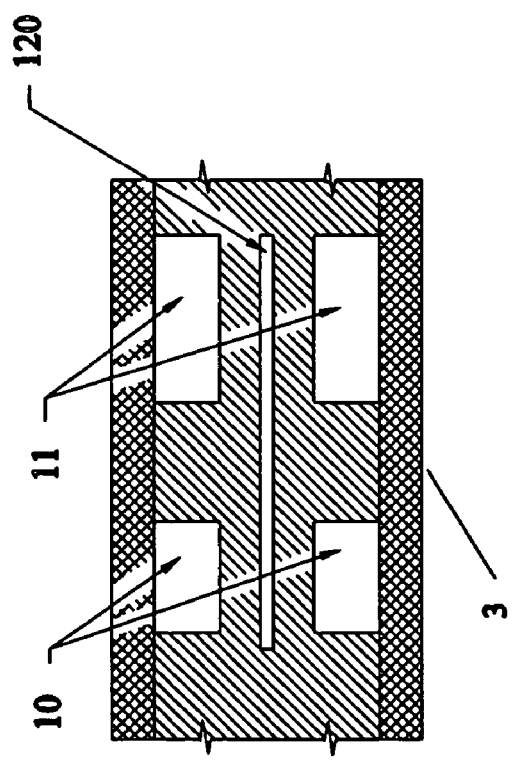
FIG. 21 is cross-sectional view of the torus that shows certain special features.

FIG. 21 shows passages 10 that admit air to the combustion chamber 3 and passages 11 that connect the combustion chamber 3 to the torus 13 when the combustion chamber 3 is firing.

Between the two passages 10 and the two passages 11 there is the slot 120. In fact, the passages 10 and 11 are separated in order to permit the central location of the slot 120. This slot 120 is one of those that accept the pin 83 from a "stationary" piston 76.

Although FIG. 20 and FIG. 21 show the piston pin stator slot 120 at one combustion chamber 3 only, the general design features apply equally to the area of the engine near the fresh air inlets 1 and the flue gas outlets 2 as well.

The slots in the rotor 13, although not shown, are only long enough to permit the piston pin 82 to connect the piston 76 to the rotor 13. An analysis will show that the theoretical length of the slots in the rotor 13 will be the same as the length of the movement of the plunger plates 76 and 77, when the piston is engaged by another piston.

It should be noted that the slots 120 do not result in detrimental air or gas leakage past the pistons. Looking at the left side of FIG. 8 and FIG. 9: The piston 115 that has compressed the air in the combustion chamber 3 acts to seal the compressed air in the combustion chamber 3. Any tendency of the compressed air to leak downstream of the piston 115 would be stopped by the piston ring 81. There would be no compressed air leakage forward of the piston 115 toward piston 110 because the compressed air pressure at port 11 is the same as the compressed air pressure at port 10. The possibility of compressed air leaking forward of piston 110 would be stopped by the piston ring 86 in piston 110.

Thus, it can be seen that during the micro-seconds that pistons such as 115 and 110 are in the positions shown in FIG. 8 and FIG. 9, the piston rings 81 and 86 prevent air leakage past the pistons.

It will be understood that the reasoning that applies to the left side of the torus applies equally to the right side of the torus and to the areas between the fresh air inlet ducts 1 and the exhaust ducts 2.

Lubrication

The design of the torus engine presents special piston lubrication needs and possibilities.

It is recommended that a lubricant be injected through the stator 12 in front of pistons immediately before they begin turning with the rotor 13. In FIG. 7 oil would be injected through the stator 12 just ahead of pistons 110 and 113 at the same time that the spark plugs fire and fuel is injected into the combustion chambers 3. In FIG. 11 oil would be injected ahead of pistons 111 and 114 just as they begin moving.

Oil would be drained from the torus into a common container at appropriate points; for example, near the flue gas outlets 2 to collect the oil ahead of pistons 110 and 113, as shown in FIG. 7, and between the ports 10 and 11, as shown in FIG. 12. Lubricating oil would be recalculated.

Another means of lubricating the pistons 76 and the walls of the torus 8 would be to use a gasoline/lubricating oil mixture as is done now with two-cycle engines. Other lubrication approaches may also be used.

Multiple Engines

It is possible for multiple torus engines of the designs described herein to be connected to a single drive shaft. Such an arrangement would be useful, for example, where extreme overall reliability is required, such as in aircraft.

Multiple engine connections also could be used in automobiles and trucks where high horsepower is required for acceleration but only modest horsepower is required for steady-state driving.

To enable the use of multiple engines, any number of engines could be connected to a common drive shaft by means of automatic clutches. In case of the failure of one engine, the intact engine(s) would continue running while the faulty engine was disconnected automatically from the drive shaft. In cases where less horsepower would be required, such as in automobiles, one or more engines could be disconnected from the drive shaft automatically by programmed controls.

I claim:

1. A rotary machine comprising:
   a housing divided into a first stationary portion and a second rotational portion, the housing having an axis, the second rotational portion being supported for rotation with respect to the stationary portion about the housing axis;
   the first and second portions of the housing cooperating to define a generally toroidal passage which is coaxial with the housing axis, the toroidal passage having a cross section;
   a first piston disposed in the passage;
   a second piston disposed in the passage;
   each piston having an interconnection mechanism for selectively interconnecting the piston to either the stationary portion or the rotational portion;
   each piston comprising:
      a central piston body;
      a first plunger plate defining a leading face of the piston;
      a second plunger plate defining a trailing face of the piston;
      the interconnection mechanism at least partially disposed in the piston body;
      a first connecting member movably interconnecting the first plunger plate with the interconnection mechanism;
      a second connecting member movably interconnecting the second plunger plate with the interconnection mechanism, the first and second connecting members being in mechanical communication such that movement of one of the plunger plates towards the central piston body causes corresponding movement of the other of the plunger plates away from the central piston body;
      the connecting members and the interconnection mechanism each having a length, the combined length of the connecting members and the interconnection mechanism being greater than a length of the central piston body; and
      the interconnection mechanism further including an engagement member operable to interconnect the piston with the stationary portion of the housing or with the rotational portion of the housing, the engagement member being in mechanical communication with the connecting members such that movement of the connecting members in the direction of rotation of the rotational portion of the housing causes the engagement member to interconnect the piston with the rotational portion of the housing and movement of the connecting members in a direction opposite the direction of rotation causes the engagement member to interconnect the piston with the stationary portion of the housing; and
   wherein a compression area is defined between the first and second pistons such that when the first piston moves toward the second piston, a gas in the compression area is compressed.

2. The rotary machine according to claim 1, wherein the housing further has a combustion chamber defined therein, the combustion chamber being in fluid communication with the toroidal passage.

3. The rotary machine according to claim 1, wherein the housing is divided into the first and second portions generally along a plane which is perpendicular to the axis of the housing, a seal being provided between the first and second portions.

4. The rotary machine according to claim 1, wherein the first and second portions of the housing are inner and outer portions with the division being defined generally on a cylindrical surface coaxial with the axis of the housing, a seal being provided between the first and second portions.

5. The rotary machine according to claim 1, wherein the compression of the gas between the first and second piston urges the trailing plunger plate of the first piston towards the central piston body of the first piston and urges the leading plunger plate of the second piston toward the central piston body of the second piston thereby connecting the first piston with the rotational portion of the housing and connecting the second piston with the stationary portion of the housing.

6. The rotary machine according to claim 1, wherein the first and second portions of the housing each have slots defined therein for cooperation with the engagement member of the pistons, each slot having a length along the rotational direction such that limited rotational motion of the piston can occur when an engagement member of the piston is engaged with the slot.

7. The rotary machine according to claim 1, wherein the cross section of the toroidal passage in generally circular.

8. A piston for use in a rotary machine having a stationary portion and a rotational portion cooperating to define a generally toroidal passage, the piston comprising:
   a central piston body;
   a first plunger plate defining a first end face of the piston;
   a first connecting member movably interconnecting the first plunger plate with the central piston body;
   a second plunger plate defining a second opposing end face of the piston;
   a second connecting member movably interconnecting the second plunger plate with the central piston body, the first and second connecting members being in mechanical communication such tat movement of one of the plunger plates towards the central piston body causes corresponding movement of the other of the plunger plates away from the central piston body; and
   an interconnection mechanism including a first engagement member operable to interconnect the piston with the stationary portion of the housing and a second engagement member operable to interconnect the piston with the rotational portion of the housing, the interconnection mechanism being in mechanical communication with the connecting members such that movement of the first plunger plate towards the piston body causes the first engagement member to interconnect the piston with the stationary portion of the housing and such that movement of the second plunger plate towards the piston body causes the second engagement member to interconnect the piston with the rotational portion of the housing.

9. The piston according to claim 8, wherein the interconnection members are pins.

10. The piston according to claim 8, wherein the first and second engagement member are in mechanical communication such that movement of the first engagement member to interconnect the piston with the stationary portion of the housing causes corresponding movement of the second engagement member so as to disconnect the piston from the rotary portion of the housing.

11. A method of compressing and expanding a gas, comprising:
providing a rotary machine comprising:
a housing divided into a first stationary portion and a second rotational portion, the housing having an axis, the second rotational portion being supported for rotation with respect to the stationary portion about the housing axis;
the first and second portions of the housing cooperating to define a generally toroidal passage which is coaxial with the housing axis, the toroidal passage having a cross section;
a first piston disposed in the passage;
a second piston disposed in the passage;
each piston having an interconnection mechanism for selectively interconnecting the piston to either the stationary portion or the rotational portion;
interconnecting first piston with the stationary portion of the housing;
each piston comprising:
a central piston body;
a first plunger plate defining leading face of the piston;
a second plunger plate defining a trailing face of the piston;
the interconnection mechanism at least partially disposed in the piston body;
a first connecting member movably interconnecting the first plunger plate with the interconnection mechanism;
a second connecting member movably interconnecting the second plunger plate with the interconnection mechanism, the first and second connecting members being in mechanical communication such that movement of one of the plunger plates towards the central piston body causes corresponding movement of the other of the plunger plates away from the central piston body;
the connecting members and the interconnection mechanism each having a length, the combined length of the connecting members and the interconnection mechanism being greater than a length of the central piston body; and
the interconnection mechanism further including an engagement member operable to interconnect the piston with the stationary portion of the housing or with the rotational portion of the housing, the engagement member being in mechanical communication with the connecting members such that movement of the connecting members in the direction of rotation of the rotational portion of the housing causes the engagement member to interconnect the piston with the rotational portion of the housing and movement of the connecting members in a direction opposite the direction of rotation causes the engagement member to interconnect the piston with the stationary portion of the housing;
interconnecting the second piston with the rotational portion of the housing; and
rotating the rotational portion of the housing and the second piston such that the second piston moves toward the first piston, thereby compressing a gas between the pistons.

12. The method according to claim 11, further comprising the steps of:
disconnecting the first piston from the stationary portion of the housing;
interconnecting the first piston with the rotational portion of the housing;
disconnecting the second piston from the rotational portion of the housing;
interconnecting the second piston with the stationary portion of the housing;
rotating the rotational portion and the first piston such that the first piston moves away from the second piston, thereby expanding a gas between the pistons.

13. The method according to claim 12, wherein the housing of the rotary machine further comprises a combustion chamber in fluid communication with the toroid, the method further comprising the steps of:
compressing a combustible mixture in the combustion chamber when the second piston moves towards the first piston;
igniting the compressed combustible mixture so as to create expansion of gas; and
using the expansion of gas to move the first piston away from the second piston.

* * * * *

UNITED STATES PATENT AND TRADEMARK OFFICE
CERTIFICATE OF CORRECTION

PATENT NO. : 7,305,937 B2  Page 1 of 1
APPLICATION NO. : 11/260953
DATED : December 11, 2007
INVENTOR(S) : Darrel B. Sabin It is certified that error appears in the above-identified patent and that said Letters Patent is hereby corrected as shown below:

Column 10, Line 44, replace "tat" with --that--

Column 11, Line 25, replace "defining leading" with --defining a leading--

Signed and Sealed this

Twenty-seventh Day of May, 2008

JON W. DUDAS
*Director of the United States Patent and Trademark Office*